Jan. 5, 1965     A. L. SEMON     3,164,173
QUICK-OPENING VALVES
Filed March 18, 1963
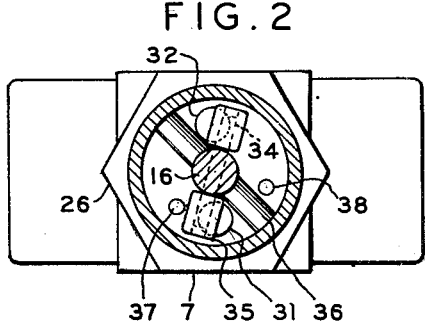
FIG. 2
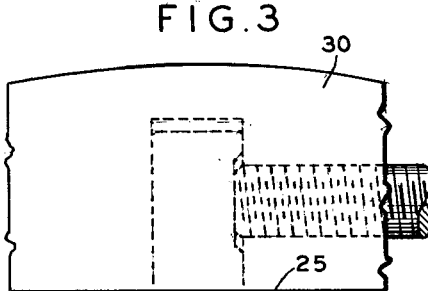
FIG. 3
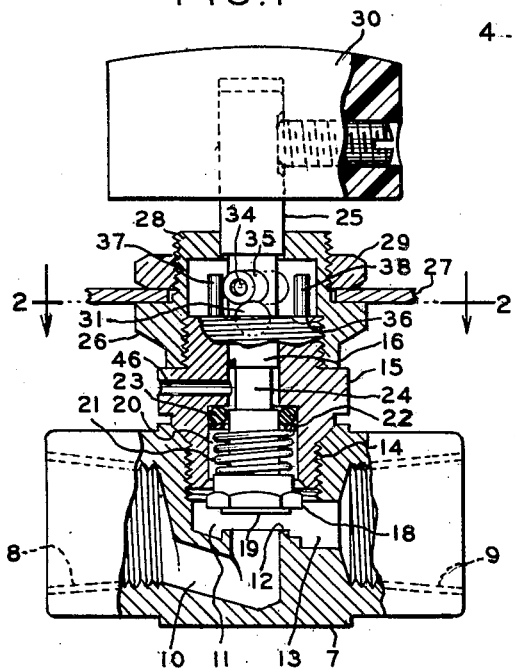
FIG. 1
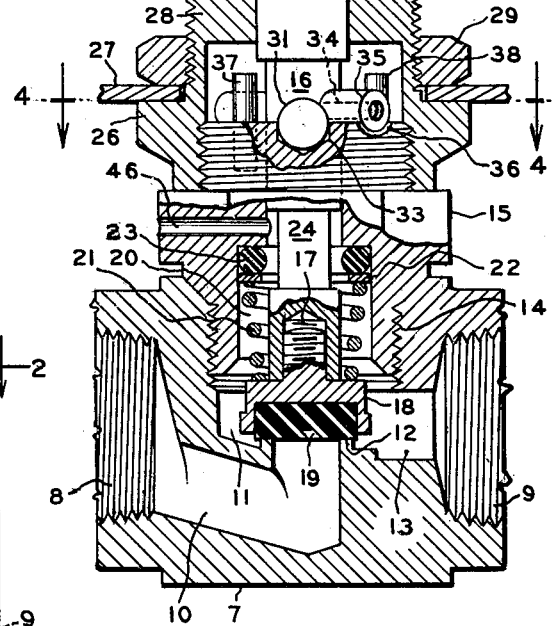
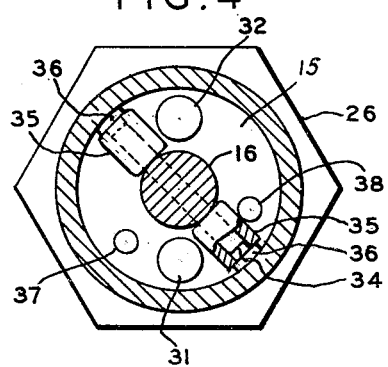
FIG. 4
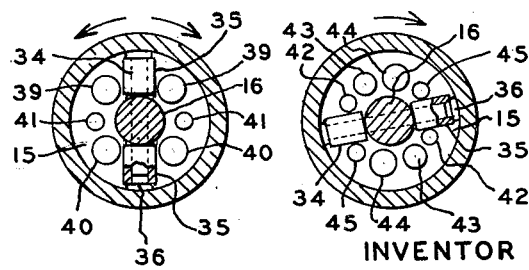
FIG. 5     FIG. 6
INVENTOR
ALBERT L. SEMON
BY *John A. Seifert*
ATTORNEY United States Patent Office 3,164,173
Patented Jan. 5, 1965

3,164,173
QUICK-OPENING VALVES
Albert L. Semon, Short Hills, N.J.
(260 S. 20th St., Newark 3, N.J.)
Filed Mar. 18, 1963, Ser. No. 265,680
12 Claims. (Cl. 137—625.26)

This invention relates to valves in which the valve stem is rotatably and slidably mounted in the valve casing whereby the valve is closed and opened by the turning movement of the valve stem causing longitudinal movement of the valve stem by projections on the valve stem riding off and onto cam surfaces, such as balls, secured in the valve casing.

The present application is a continuation in-part of my application Serial No. 42,107 filed July 11, 1960, said application being now abandoned.

It is an object of this invention to arrange the balls and projections in conjunction with abutments so that it requires only one-sixth of a revolution of the stem to open and close the valve.

It is another object of the invention to provide a locking arrangement between said balls, projections and abutments whereby the valve is retained in open position until the valve stem is turned in the opposite direction to close the valve.

Other objects and advantages of the invention will be described hereinafter.

In the drawing accompanying and forming a part of this application:

FIGURE 1 is a vertical-sectional view of my valve in open position;

FIGURE 2 is a cross-sectional view taken on the line 2—2 of FIGURE 1 looking in the direction of the arrows to show the locking engagement of the projection between a ball and an abutment;

FIGURE 3 is a vertical-sectional view, on an enlarged scale, of the valve in closed position;

FIGURE 4 is a cross-sectional view taken on the line 4—4 of FIGURE 3 looking in the direction of the arrows to show the projections out of engagement with the balls and one of the projections abutting one of the abutments;

FIGURE 5 is a cross-sectional view similar to FIGURE 4 showing the use of two pairs of balls whereby the valve is opened by turning the valve stem in either a clockwise direction or a counter-clockwise direction; and FIGURE 6 is a cross-sectional view similar to FIGURES 4 and 5 showing the use of two series of balls with the balls of each series of increasing diameters.

The embodiment of the invention comprises a casing including a pipe coupling 7 having an internal screw-threaded inlet 8 and an internal screw-threaded outlet 9. The inlet 8 is provided with a passage 10 leading to a chamber 11 arranged with a valve seat 12 around the terminus of the passage 10. The outlet 9 is provided with a passage 13 communicating with the chamber 11, as shown in FIGURES 1 and 3. The chamber 11 is arranged with an internal screw-threaded opening 14 in axial alignment with the valve seat 12 for the mounting of a member 15 having an axial bore for slidably and rotatably supporting a stem 16 having a screw-threaded recess 17 in the inner end for the mounting of a valve comprising a cup-shaped member 18 and a resilient insert 19 adapted to engage the valve seat 12, as shown in FIGURE 3.

The supporting member 15 is provided with an annular recess 20 to permit the reciprocatory movement of the valve 18, 19 and for mounting a spring 21 on the stem 16 between a washer 22 and the cup member 18. The bore of the member 15 is fluid sealed by a gasket 23 interposed between the washer 22 and the end of the recess 20, as shown in FIGURES 1 and 3. The gasket 23 is an O ring so that when the valve 18, 19 is in open position, the gasket 23 prevents leakage past said recessed end of the valve stem 16, as shown in FIGURE 1, and when said valve is in closed position, the gasket 23 allows air to exhaust from the passage 13 past a reduced diameter portion 24 of the stem 16, as shown in FIGURE 3.

The end portion of the stem 16 opposite the end arranged with the valve 18, 19 is of increased diameter, as shown at 25 in FIGURES 1 and 3, and is rotatably and slidably supported in a cap member 26 screw threaded on the end of the supporting member 15. The valve casing 7 is supported on a panel 27 by inserting a reduced screw-threaded end portion 28 of the cap member 26 into an opening in the panel and clamping the body of the cap member 26 against the panel by a nut 29 screw-threaded on the portion 28, as shown in FIGURES 1 and 3. The end of the stem portion 25 projecting from the cap member 26 is provided with a manipulating handle 30 to impart rotation to the stem 16.

The rotation of the stem 16 will impart axial movement to said stem and move the valve 18, 19 against the spring 21 and away from the valve seat 12. One manner of accomplishing this result is shown in FIGURES 1 to 4, inclusive, and comprises a pair of balls 31, 32 secured in recesses 33 in the supporting member 15 on diammetrically opposite sides of the stem 16, as shown in FIGURES 1 and 3. The recesses 33 are .005″ to .008″ less than the diameters of the balls 31, 32 and the depths of said recesses are such that when said balls are forced into said recesses, the exposed portions of the balls are from .008″ to .012″ less than the diameters of said balls. Projections are provided on the stem 16 between the reduced portions 24 and the increased diameter portion 25 in the form of a pin 34 mounted in a portion of the stem positioned in the cap member 26 to extend transversely of the stem with the opposite end portions of the pin projecting from the opposite sides of the stem and each end portion of the pin 34 being provided with a roller 35. In the closed position of the valve 18, 19, the axis of the projecting ends of the pin 34 will extend in a plane below the upper surfaces of the balls 31, 32 with the rollers 35 positioned in a groove 36 extending diagonally of the top of the supporting member 15 and between the balls 31, 32. As shown in FIGURE 3, the rollers 35 do not rest on the bottom of the groove 36 due to the valve insert 19 abutting the valve seat 12, and therefore the positioning of the rollers 35 in the groove 36 will not interfere with the turning of the valve stem 16. As shown in FIGURES 2 and 4, the groove 36 extends from diammetrically opposite sides of the bore of the member 15. When it is desired to open the valve 18, 19, the stem 16 is turned one-sixth of a revolution in a clockwise direction which will move the rollers 35 over the balls 31, 32 to position the axis of the pin 34 above the upper surfaces of the balls and move the stem 16 and the valve 18, 19 in a direction from the valve seat 12 to open the passages 10 and 13 in communication with each other and permit the flow of fluid through the casing 7 from the inlet 8 to the outlet 9. When it is desired to close the valve 18, 19, the stem 16 is turned in a counter-clockwise direction one-sixth of a revolution which will position the axis of the pin 34 below the upper surfaces of the balls 31, 32.

The rotation of the stem 16 is limited to one-sixth of a revolution by abutments in the form of pins 37 and 38 fixed in the supporting member 15 in the arc of travel of the rollers 35 and on opposite sides of the ball 31. The pin 37 is adjacent to the ball 31 so that one of the rollers 35 in the open position of the valve 18, 19 is engaged between the ball 31 and the abutment pin 37 to lock the stem 16 against accidental movement to close the valve 18, 19 by the spring 21, as shown in FIGURES 1 and 2. The abutment pin 38 is spaced a distance from the ball 31 and on the same side of the groove 36 as the ball 32 is positioned to permit the positioning of the axis of the pin 34 below the upper surfaces of the balls 31, 32 and the rollers 35 in the groove 36. If desired, the valve 18, 19 may be opened by turning the stem 16 in a counter-clockwise direction by having the groove 36 extend diagonally with one end on the right hand side of the ball 32 and the other end on the left hand side of the ball 31, looking at FIGURES 2 and 4, and the pin 37 on the same side of the groove 36 as the ball 32 and the pin 38 being adjacent to the ball 31.

FIGURE 5 shows an arrangement of parts whereby the stem 16 is turned in either direction to open the valve 18, 19, as shown by the arrows. This is accomplished by two pairs of balls 39 and 40 secured in the supporting member 15 in the same manner as the balls 31 and 32. The balls 39 and 40 of each pair are spaced from each other a distance slightly greater than the diameters of the rollers 35. Abutment pins 41 are fixed in the supporting member 15 midway between the pairs of balls 39 and 40. The groove 36 extends between the balls 39 and 40 of each pair of balls. In this arrangement of parts, when it is desired to open the valve 18, 19, the stem 16 is turned in either a clockwise or counter-clockwise direction to move the rollers 35 from the groove 36 to a position between a ball 39 and a ball 40 of each pair of balls and each of the pins 41 which will move the stem 16 and the valve 18, 19 from the valve seat 12 and retain the valve 18, 19 in open position.

FIGURE 6 shows an arrangement of parts which is similar to the arrangement of parts shown in FIGURES 1 to 4, inclusive, except that during the valve opening movement of the stem 16, the rollers 35 are supported to impart a gradual longitudinal movement to the stem 16. This is accomplished by two series of balls 42, 43 and 44 of increasing diameter. The balls 42, 43 and 44 are secured in the supporting member 15 in the same manner as the balls 31 and 32. Abutment pins 45 are fixed in the supporting member 15 on opposite sides of the groove 36 and adjacent to the balls 44 of largest diameter. The operation of this arrangement of parts is the same as the other arrangements of parts. When the rollers 35 are positioned in the groove 36, the valve 18, 19 is in closing engagement with the valve seat 12. When it is desired to open the valve 18, 19, the stem 16 is turned in a clockwise direction which will successively engage the rollers 35 with the balls 42, 43, 44 until the rotation of the stem 16 is stopped by the abutment pins 45 with the rollers 35 between the balls 44 and the abutment pins 45. By this arrangement of parts, it will take slightly more than a quarter revolution to completely open the valve 18, 19 but during said quarter revolution, the rotation of the stem 16 may be stopped and the valve 18, 19 retained in partial open positions by positioning the rollers 35 between the balls 42 and 43 or between the balls 43 and 44.

To provide a three-way operating valve, the chamber 11 is vented, when the valve 18, 19 is in closing engagement with the valve seat 12, through an opening 46 in the supporting member 15 communicating at the opposite ends with the atmosphere and a portion of the bore of the member 15 adjacent to the chamber 20. When the valve 18, 19 is in closed position as shown in FIGURE 3, the outlet 9 is vented through the passage 13 and the chamber 20 and between the gasket 23 and the reduced diameter portion 24 of the valve stem 16 to the opening 46. In the open position of the valve 18, 19, the gasket 23 will form a seal and prevent leakage through the opening 46, as shown in FIGURE 1.

Having thus described my invention, I claim:

1. In a quick-opening valve, a casing having an inlet and an outlet, a valve seat in the casing between the inlet and outlet, a stem rotatably and slidably mounted in the casing and extending axially of the valve seat with the end portion projecting from the casing, a valve member secured to the opposite end of the stem to engage and disengage the valve seat by the sliding movement of the stem, a plurality of balls secured in the casing circumferentially of the stem, projections fixed to and extending laterally from the stem, abutments fixed in the casing to extend parallel of the stem and between the balls and in the circumference on which the balls are secured and one of the abutments being adjacent to one of the balls, and a spring urging the stem toward the valve seat to engage the valve member with the valve seat and position the axes of the projections in a plane below a plane extending tangentially of the uppermost surfaces of the balls, and a slight turning of the stem moving the projections over the balls and positioning one of the projections between an abutment and its adjacent ball causing sliding movement of the stem and the valve member to disengage the valve member from the valve seat and retain same in said disengaged position.

2. A quick-opening valve as claimed in claim 1, wherein the projections extend from diametrically opposite portions of the stem.

3. A quick-opening valve as claimed in claim 1, wherein the projections comprise a pin fixed in the stem with the opposite end portions of the pin extending from the stem.

4. A quick-opening valve as claimed in claim 1, wherein the projections comprise a pin fixed in the stem with the opposite end portions of the pin extending from the stem, and rollers mounted on said end portions of the pin.

5. A quick-opening valve as claimed in claim 4, wherein the casing is arranged with a groove extending across the casing and intersecting the valve stem with a ball and an abutment on each side of said groove to receive the rollers when the valve member engages the valve seat.

6. A quick-opening valve as claimed in claim 1, wherein the abutments comprise a pair of pins.

7. A quick-opening valve as claimed in claim 1, wherein the plurality of balls comprise two balls, each ball being secured on diametrically opposite sides of the stem, and the abutments are fixed in the casing on one side of the stem where one of the balls is secured.

8. A quick-opening valve as claimed in claim 1, wherein the plurality of balls comprise two pairs of balls, the balls of each pair being spaced apart, and each pair of balls being secured on diametrically opposite sides of the stem, and the abutments being fixed midway between the pairs of balls.

9. A quick-opening valve as claimed in claim 8, wherein the space between the balls of each pair of balls being slightly greater than the widths of the projections.

10. A quick-opening valve as claimed in claim 1, wherein the plurality of balls comprise two series of three balls each with the diameters of the balls of each series increasing in size, and the abutments being fixed in the casing adjacent to the largest ball of each series and spaced from the smallest ball of each series.

11. A quick-opening valve as claimed in claim 10, wherein the spaces between the abutments and the smallest balls being slightly greater than the widths of the projections.

12. A quick-opening valve as claimed in claim 1, wherein the stem is arranged with a reduced diameter portion adjacent to the valve member and spaced from the casing wall, providing a bypass recess, and a vent opening in the casing communicating with the atmosphere and said bypass recess of the stem, seal means for closing said vent when said valve member is in the disengaged position.

References Cited by the Examiner
UNITED STATES PATENTS

| | | | |
|---|---|---|---|
| 751,869 | 2/04 | Newton | 137—625.27 |
| 1,274,646 | 8/18 | Watrous | 251—254 |
| 1,511,830 | 10/24 | Foley | 251—254 |
| 1,722,401 | 7/29 | Todd | 251—254 |

M. CARY NELSON, *Primary Examiner.*

LAVERNE D. GEIGER, *Examiner.*